Figure 1:
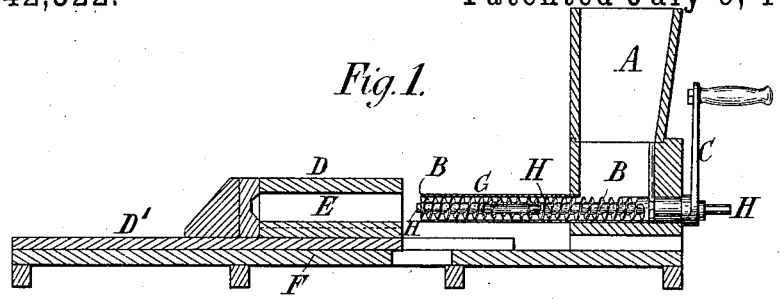

(No Model.) 2 Sheets—Sheet 1.
T. C. BATCHELOR.
MACHINE FOR FILLING CARTRIDGE OR OTHER CASES.
No. 542,322. Patented July 9, 1895.

Witnesses
Inventor
T. C. Batchelor

UNITED STATES PATENT OFFICE.

TELFORD CLARENCE BATCHELOR, OF LONDON, ENGLAND.

MACHINE FOR FILLING CARTRIDGE OR OTHER CASES.

SPECIFICATION forming part of Letters Patent No. 542,322, dated July 9, 1895.

Application filed January 9, 1892. Serial No. 417,524. (No model.) Patented in England March 13, 1890, No. 3,983; in France March 26, 1891, No. 212,382; in Switzerland March 28, 1891, No. 3,578; in Spain March 30, 1891, No. 11,924, and in Belgium April 1, 1891, No. 94,376.

*To all whom it may concern:*

Be it known that I, TELFORD CLARENCE BATCHELOR, a subject of the Queen of England, residing at London, England, have invented certain new and useful Improvements in or Relating to Case or Mold Filling Apparatus, (for which I have obtained Letters Patent in the following countries, viz: Great Britain, No. 3,983, dated March 13, 1890; France, No. 212,382, dated March 26, 1891; Belgium, No. 94,376, dated April 1, 1891; Spain, No. 11,924, dated March 30, 1891, and Switzerland, No. 3,578, dated March 28, 1891,) of which the following is a specification.

This invention, as will be evident, may be used for a variety of purposes, but is especially applicable for filling cartridge-cases for high explosives.

By this invention I am enabled to charge the case into which the material is filled at an even density right through, and in carrying my invention into practice I prefer to proceed as follows: I construct any suitable form of hopper and carrying-frame or bed-plate, and upon the frame or bed-plate I arrange one or more suitable slides or equivalent, which carry the case to be filled. At the lower portion of the hopper I have one or more Archimedean screws, preferably arranged horizontally, and around each of these I prefer to have a tube, the upper half of which may be removed at that portion which extends into the hopper. Where more than one screw is employed I prefer to connect them by gearing or otherwise, so that the turning of a single handle or equivalent may revolve all the screws. The before-described slides or equivalent are so arranged that they can be loaded by weight, friction, or otherwise, so that the pressure requisite to move them may be adjusted as may be found desirable.

The operation of this part of the mechanism is as follows: The case to be filled is placed upon the screw-tube and the slide brought up, or the case may be first placed in the slide and then moved onto the tube. The material to be filled is placed in the hopper, and as the screw is revolved the material is carried along the tube and into the case, into which it is forced by the end of the screw. By this means the case is gradually forced off the tube as it is filled with the material, so that as it finally leaves the tube the case is full of the material compressed at an equal density all through. This density, as will be understood, may be varied according to the load placed upon the slide or whatever carries the case.

It will be understood that the mechanism which carries the case may be considerably varied so long as the necessary pressure is obtainable upon the tube. For example, the tube may be simply passed through a bearing or opening, in which it is held sufficiently tight to give the required pressure; or, again, the tube may be connected with a cord and weight, so as to obtain the pressure; or, again, friction may be caused between the case and the tube.

As a convenient means of stirring the materials in the hopper and supplying them freely to the screw or screws, I may place in the lower portion of the hopper a shaft at right angles to the axis of the screw, which carries, preferably, at each end a worm or equivalent device, which will draw or force the material toward the screw and may also, if desired, stir it as well. Upon this shaft I arrange a worm-wheel or equivalent adapted to engage with the filling-screw, so that as the latter is revolved the cross-shaft will also be turned. Other means, however, may be employed for revolving this shaft, or an independent stirring and filling apparatus may be employed.

Figure 2:
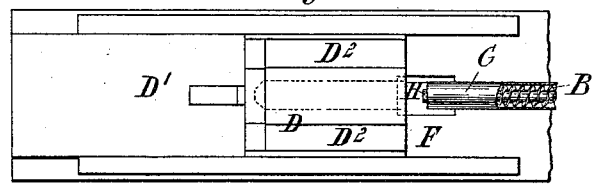
Figure 3:
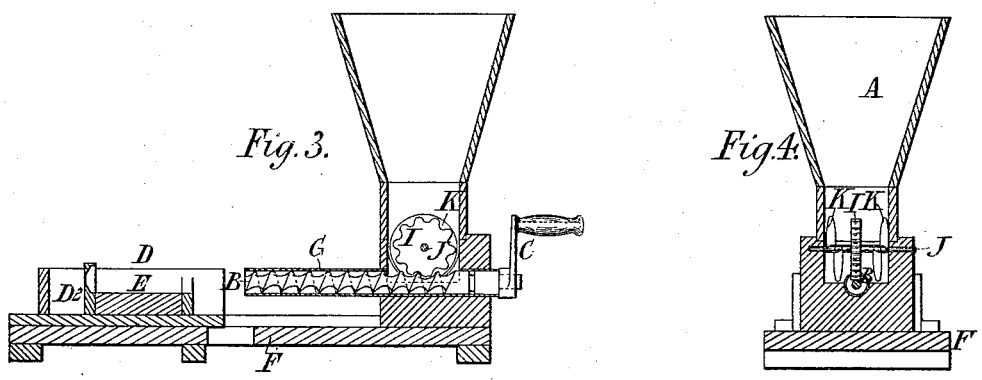
Figure 4:
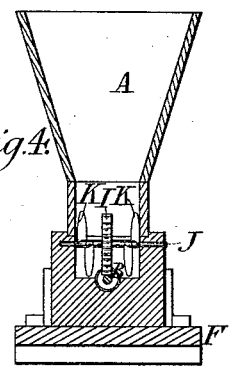
Figure 5:
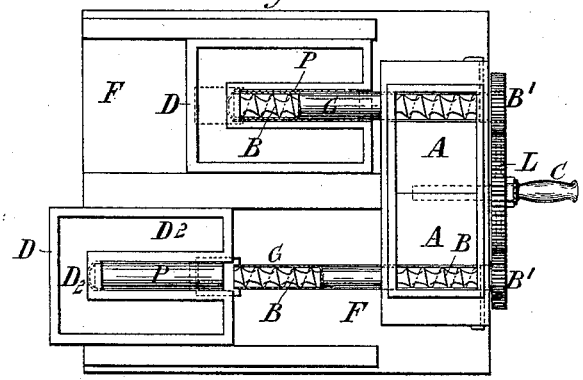
Figure 6:
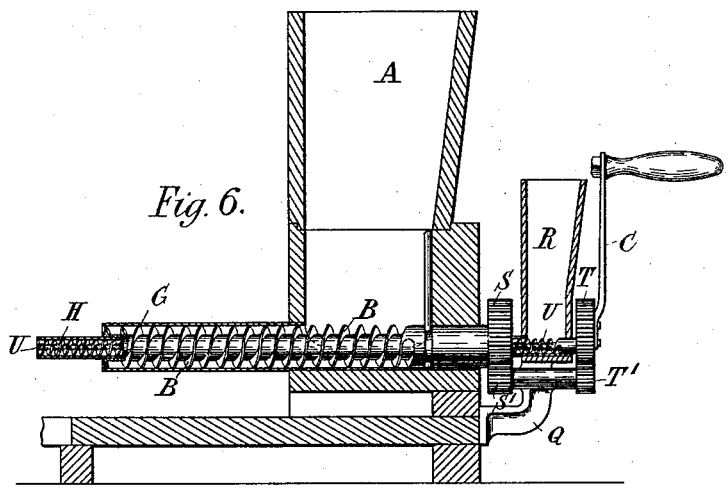

In the accompanying drawings, Figure 1 is a vertical section of a simple form of the apparatus; and Fig. 2, a plan, partly in section, of a portion of the same. Fig. 3 is a vertical longitudinal section, and Fig. 4 a vertical cross-section, of a similar apparatus provided with a stirring or feeding device. Fig. 5 is a plan of a double apparatus constructed according to this invention. Fig. 6 is a sectional elevation of an apparatus adapted for making the cartridge and filling it with loose detonating material, and Fig. 7 is a perspective view of the agitator.

Like letters indicate like parts throughout the drawings.

Referring to Figs. 1 and 2, A is the hopper, and B the filling-screw, adapted to be revolved by the handle C or by any other convenient means.

D is a carriage provided with a recess E, preferably of about the same shape and size as the case which is intended to be placed within it. This carriage D is adapted to slide upon the frame or bed F, and may be lengthened out at D', so as to provide a longer bearing. The carriage D may also have boxes or spaces D², adapted to contain sand, shot, or other weight, which it is desired to place in it to cause the required amount of friction between the carriage D and the bed upon which it slides, and, if desired, any additional weight may be placed on D'.

Around the filling-screw B is a tube G, which preferably extends throughout its working length; but the upper portion of which is cut away within the hopper, as shown, to allow of the free access of the materials within the hopper to the screw. In operating this simple form of the apparatus the cartridge-case is placed upon the tube G and the carriage D closed upon it, or the case may first be placed in the carriage D and the whole pushed up, so that the tube G penetrates to about the closed end of the cartridge-case. The handle C is then turned, or the filling-screw B is by other means caused to revolve, and the contents of the hopper A, being forced along the screw, are forced into the cartridge-case by the open end of the tube G, and as the materials are forced forward the carriage D and case are pushed away from the tube until they finally leave it, when the case is full. By this arrangement and the load upon the carriage D, that is upon the cartridge-case, being almost the same, the material within the case will be of the same density all through.

If it is desired that the cartridge should have a central longitudinal opening through it, as is sometimes required, a mandrel H may be passed through the center of the filling-screw B, which for this purpose would then be left hollow, as illustrated in Fig. 1, where a portion of the screw is shown broken away to indicate this. The mandrel H would reach to the end of the cartridge-case, and, being adapted to slide freely within the screw B, it would, when gripped by the material as it was compressed in the case, be drawn along with it, and would thus maintain the open space in the center of the cartridge. If necessary, however, positive means may be employed to force the mandrel H along with the cartridge; but in that case the power applied must be constant, or the compression of the material may vary, and, where practicable, the former plan is preferred. The mandrel H may be solid, or a simple tube closed or not at the ends. If there be an opening in the end of the cartridge-case, it does not matter, as the mandrel H may be secured in the cartridge, and thus caused to travel with it.

In Fig. 3 the arrangement is substantially the same as that indicated in Fig. 1; but within the hopper is a worm-wheel I, carried upon a spindle J, having bearing in the hopper or framework, and upon this spindle are secured two feeding-worms K, one right hand and one left hand, the arrangement being such that as the filling-screw B revolves it operates the wheel I and shaft J, which carry round the feeding-worms K, which operate to drive the material at the bottom of the hopper toward the filling-screw B, and also serve to mix the materials more completely than might otherwise be the case. If desired, also, the feeding-worms K may be roughened or provided with pins, projections, ledges, or equivalent devices to facilitate the mixing operations.

In Fig. 5 an apparatus similar to those previously described is shown, but having two filling-screws B and two cartridge-carriages D. The screws B carry gearing B', which, engaging with the central wheel L, which is operated by the handle C, causes the screws B to revolve as the handle is turned. Both these screws can therefore be operated together. In this figure one of the carriages D is shown in position for starting the operation with the screw penetrating to the end of the cartridge-case, and the other one is shown at the other end of its travel, with the cartridge-case clear of the screw and its tube G.

If desired, where more than one screw is employed in the same machine any suitable means for disconnecting any of the screws may be employed, so as to enable the screws to work consecutively instead of simultaneously.

In Fig. 6 is shown means for making a hollow cartridge and filling the hollow with detonating material, either the same as that of which the cartridge is composed or a different material. Here the mandrel H instead of traveling is a fixture in the bracket Q or other suitable part and extends to the bottom of the hopper R, to which it is open, as in the case of the larger tube G. The screw B has secured upon it a toothed wheel S, which gears with a pinion S', upon the other end of the shaft of which is another pinion T' engaging with the toothed wheel T, which latter can be turned by the handle C as before. The wheel T or the handle C, or both, is connected with the small worm U, which traverses the hollow interior of the mandrel H, and the operation of this mechanism is that as the handle C is turned both the worms B and U are revolved, the large worm B forcing forward the material for the cartridge and the worm U receiving from the hopper R the detonating material for the interior of the cartridge. The gearing S S' T T' may be made of any desired proportion and the pitches of the screws may be varied as required to produce the proper results. Other means besides the gearing shown may be employed for operating one or both of the worms. The portion of the mandrel H which projects beyond the worm B insures the hollow all through the cartridge, which may be longer than the projecting portion of H.

Where it is required to form pellets or plugs of the explosive material, this may be accomplished by extending the tube G beyond the worm B and forcing out a plug, lengths of which can be severed according to requirement. Where the tube G extends beyond the end of screw B, the density of the cartridge or pellet may be adjusted by the length of such extension, the longer the extension the greater the density in a parallel tube. If the mandrel be also extended beyond the end of the screw, these plugs or pellets will have holes through them.

If desired, either or both of the screws B and U may be made with two or more threads, so that the cartridge may leave the screw with a balanced pressure of the threads upon opposite sides of it.

I claim—

1. In apparatus such as described the combination with the filling screw of a worm wheel I located at the head of such screw and adapted to be operated by said filling screw, and one or more feeding worms K connected with and operated by said worm wheel substantially as and for the purpose described.

2. In an apparatus such as described, the combination with the filling screw, and its surrounding tube, of a hollow mandrel within such filling screw, and the worm located within such mandrel, substantially as set forth.

3. In an apparatus such as described, the combination with the filling screw and its surrounding tube, of a hollow mandrel contained within said filling screw, the worm contained within the mandrel, and means for operating said screw and worm simultaneously, substantially as set forth.

In testimony whereof I have hereto set my hand in the presence of the two subscribing witnesses.

TELFORD CLARENCE BATCHELOR.

Witnesses:
 ALFRED J. BOULT,
 HARRY B. BRIDGE.